United States Patent
Agarwal et al.

(10) Patent No.: US 11,630,869 B2
(45) Date of Patent: *Apr. 18, 2023

(54) IDENTIFICATION OF CHANGES BETWEEN DOCUMENT VERSIONS

(71) Applicant: International Business Machines Corporation, Armonk, NY (US)

(72) Inventors: Arvind Agarwal, New Delhi (IN); Vitobha Munigala, Secunderabad (IN); Mitesh H. Vasa, Mulund (IN); Shanmukha Guttula, Vijayawada (IN); Ankush Gupta, Uttarakhand (IN); Nicholas Gomez Phan, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 107 days.

This patent is subject to a terminal disclaimer.

(21) Appl. No.: 16/806,438

(22) Filed: Mar. 2, 2020

(65) Prior Publication Data

US 2021/0271718 A1    Sep. 2, 2021

(51) Int. Cl.
*G06F 16/93* (2019.01)
*G06F 16/28* (2019.01)
(Continued)

(52) U.S. Cl.
CPC .......... *G06F 16/93* (2019.01); *G06F 16/2474* (2019.01); *G06F 16/285* (2019.01); *G06F 40/30* (2020.01); *G06N 20/00* (2019.01)

(58) Field of Classification Search
None
See application file for complete search history.

(56) References Cited

U.S. PATENT DOCUMENTS 6,317,708 B1   11/2001   Witbrock et al.
6,324,555 B1   11/2001   Sites
(Continued)

FOREIGN PATENT DOCUMENTS

EP   1220120 A3   6/2005

OTHER PUBLICATIONS

Jatowt, Adam et al., "Change Summarization in Web Collections", LNAI, 2004, 10 pages, Springer-Verlag Berlin Heidelberg.
(Continued)

*Primary Examiner* — Amresh Singh
(74) *Attorney, Agent, or Firm* — Ference & Associates LLC

(57) ABSTRACT

One embodiment provides a method, including: obtaining at least two documents, wherein one of the at least two documents comprises a revision different than another of the at least two documents; identifying, within each of the at least two documents, portions corresponding to groups of text containing a conceptual unit; assigning at least a subset of the identified portions to a category type corresponding to a topic of a given portion, wherein the assigning comprises (i) generating a semantic tag for the identified portions in the subset and (ii) tagging the identified portions in the subset with the semantic tag; and determining changes between the at least two documents, wherein the determining comprises (iii) aligning given portions across the at least two documents based upon a relationship between the given portions across the at least two documents, (iv) identifying semantic differences between the aligned portions, and (v) identifying any remaining unaligned portions.

15 Claims, 3 Drawing Sheets

(51) Int. Cl.
    *G06F 40/30*     (2020.01)
    *G06N 20/00*     (2019.01)
    *G06F 16/2458*     (2019.01)

(56) References Cited

U.S. PATENT DOCUMENTS

| | | |
|---|---|---|
| 6,560,620 B1 | 5/2003 | Ching |
| 6,658,626 B1 | 12/2003 | Aiken |
| 6,963,830 B1 | 11/2005 | Nakao |
| 6,981,225 B1 | 12/2005 | Gaudette |
| 7,113,943 B2 | 9/2006 | Bradford et al. |
| 7,418,661 B2 | 8/2008 | Brandenberger |
| 8,196,030 B1 | 6/2012 | Wang et al. |
| 8,316,292 B1 | 11/2012 | Verstak et al. |
| 8,639,496 B2 | 1/2014 | Jakubik |
| 8,965,983 B2 | 2/2015 | Costenaro et al. |
| 9,092,428 B1 | 7/2015 | Zhang et al. |
| 9,569,406 B2 | 2/2017 | Shaver |
| 9,747,259 B2 | 8/2017 | Kapadia |
| 2004/0044519 A1 | 3/2004 | Polanyi et al. |
| 2005/0015716 A1 | 1/2005 | Lavoie et al. |
| 2005/0060140 A1 | 3/2005 | Maddox |
| 2005/0060643 A1 | 3/2005 | Glass et al. |
| 2006/0178868 A1 | 8/2006 | Billerey-Mosier |
| 2007/0150443 A1 | 6/2007 | Bergholz et al. |
| 2008/0104034 A1 | 5/2008 | Stewart et al. |
| 2009/0112892 A1 | 4/2009 | Cardie et al. |
| 2009/0172558 A1 | 7/2009 | Pickens et al. |
| 2009/0327921 A1 | 12/2009 | Holm-Peterson et al. |
| 2010/0235165 A1 | 9/2010 | Todhunter et al. |
| 2011/0243477 A1 | 10/2011 | Minerich |
| 2011/0276322 A1 | 11/2011 | Sandor et al. |
| 2011/0295903 A1 | 12/2011 | Chen |
| 2012/0029908 A1 | 2/2012 | Takamatsu |
| 2013/0325440 A1 | 12/2013 | Kim et al. |
| 2014/0188921 A1 | 7/2014 | Thomason et al. |
| 2015/0019208 A1* | 1/2015 | Lehmam ............... G06F 40/205 704/9 |
| 2016/0188584 A1 | 6/2016 | Glover et al. |
| 2017/0018046 A1 | 1/2017 | Lee et al. |
| 2017/0048216 A1 | 2/2017 | Chow et al. |
| 2018/0276199 A1 | 9/2018 | Gidney |
| 2018/0285326 A1* | 10/2018 | Goyal ................... G06F 40/117 |
| 2020/0175114 A1* | 6/2020 | Dechu .................. G06F 16/367 |

OTHER PUBLICATIONS

Cortes-Coy, Luis Fernando et al., "On Automatically Generating Commit Messages via Summarization of Source Code Changes", 2014 14th International Working Conference on Source Code Analysis and Manipulation, 2014, 10 pages, IEEE Computer Society.

Nunes, Sergio et al., "Summarization of Changes in Text Collections", PhD Proposal for the MAP-i Program, Dec. 18, 2012, 5 pages, University of Porto.

Mani, Inderjeet et al., "Summarizing Similarities and Differences Among Related Documents", Information Retrieval, 1999, 33 pages, Kluwer Academic Publishers, Boston, Manufactured in The Netherlands.

Trandabat, Diana., "Using semantic roles to improve summaries", Publisher: Aclweb.org, Published 2011, 6 pages.

* cited by examiner

IDENTIFICATION OF CHANGES BETWEEN DOCUMENT VERSIONS

BACKGROUND

Entities may create documents or contracts that provide identification of benefits, requirements for receiving benefits, responsibilities of the parties who have agreed to the document, explanations of terminology, and the like. For example, an insurance provider may provide a document that outlines insurance benefits, requirements for receiving the benefits, the responsibilities of the insurance provider, the responsibilities of the recipient, and the like. These documents are created so that the parties have a clear understanding of what will be provided by each of the parties and the responsibilities of the parties. Such documents are traditionally between entities that each have many people affected by the document, for example, between an insurance provider and a corporation of employees. Similar documents may also be created on a smaller scale, for example, between a single person and another person. In order to generate these documents and ensure the document completely addresses all possible issues, these documents frequently become complex and have many different sections. Iterations of these documents generally include more sections based upon lessons learned from the previous iteration. Thus, these documents may become very complex and difficult for an individual to digest or find information related to a particular topic or category.

BRIEF SUMMARY

In summary, one aspect of the invention provides a method, comprising: obtaining at least two documents, wherein one of the at least two documents comprises a revision different than another of the at least two documents; identifying, within each of the at least two documents, portions corresponding to groups of text containing a conceptual unit; assigning at least a subset of the identified portions to a category type corresponding to a topic of a given portion, wherein the assigning comprises (i) generating a semantic tag for the identified portions in the subset and (ii) tagging the identified portions in the subset with the semantic tag; and determining changes between the at least two documents, wherein the determining comprises (iii) aligning given portions across the at least two documents based upon a relationship between the given portions across the at least two documents, (iv) identifying semantic differences between the aligned portions, and (v) identifying any remaining unaligned portions.

Another aspect of the invention provides an apparatus, comprising: at least one processor; and a computer readable storage medium having computer readable program code embodied therewith and executable by the at least one processor, the computer readable program code comprising: computer readable program code configured to obtain at least two documents, wherein one of the at least two documents comprises a revision different than another of the at least two documents; computer readable program code configured to identify, within each of the at least two documents, portions corresponding to groups of text containing a conceptual unit; computer readable program code configured to assign at least a subset of the identified portions to a category type corresponding to a topic of a given portion, wherein the assigning comprises (i) generating a semantic tag for the identified portions in the subset and (ii) tagging the identified portions in the subset with the semantic tag; and computer readable program code configured to determine changes between the at least two documents, wherein the determining comprises (iii) aligning given portions across the at least two documents based upon a relationship between the given portions across the at least two documents, (iv) identifying semantic differences between the aligned portions, and (v) identifying any remaining unaligned portions.

An additional aspect of the invention provides a computer program product, comprising: a computer readable storage medium having computer readable program code embodied therewith, the computer readable program code executable by a processor and comprising: computer readable program code configured to obtain at least two documents, wherein one of the at least two documents comprises a revision different than another of the at least two documents; computer readable program code configured to identify, within each of the at least two documents, portions corresponding to groups of text containing a conceptual unit; computer readable program code configured to assign at least a subset of the identified portions to a category type corresponding to a topic of a given portion, wherein the assigning comprises (i) generating a semantic tag for the identified portions in the subset and (ii) tagging the identified portions in the subset with the semantic tag; and computer readable program code configured to determine changes between the at least two documents, wherein the determining comprises (iii) aligning given portions across the at least two documents based upon a relationship between the given portions across the at least two documents, (iv) identifying semantic differences between the aligned portions, and (v) identifying any remaining unaligned portions.

A further aspect of the invention provides a method, comprising: receiving two documents, wherein each of the two documents comprises a different version of the same document; identifying, within each of the two documents, processing units corresponding to contextually-related and positionally-connected groups of textual conceptual units; correlating processing units across the two documents, wherein the correlating comprises identifying processing units across the two documents that are related, the relationship being identified at least in part based upon an assigned category type of a corresponding processing unit; and identifying variations across the two documents, wherein the identifying comprises utilizing a classifier trained using learned similarity rules to identify additions, deletions, and changes across the two documents.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
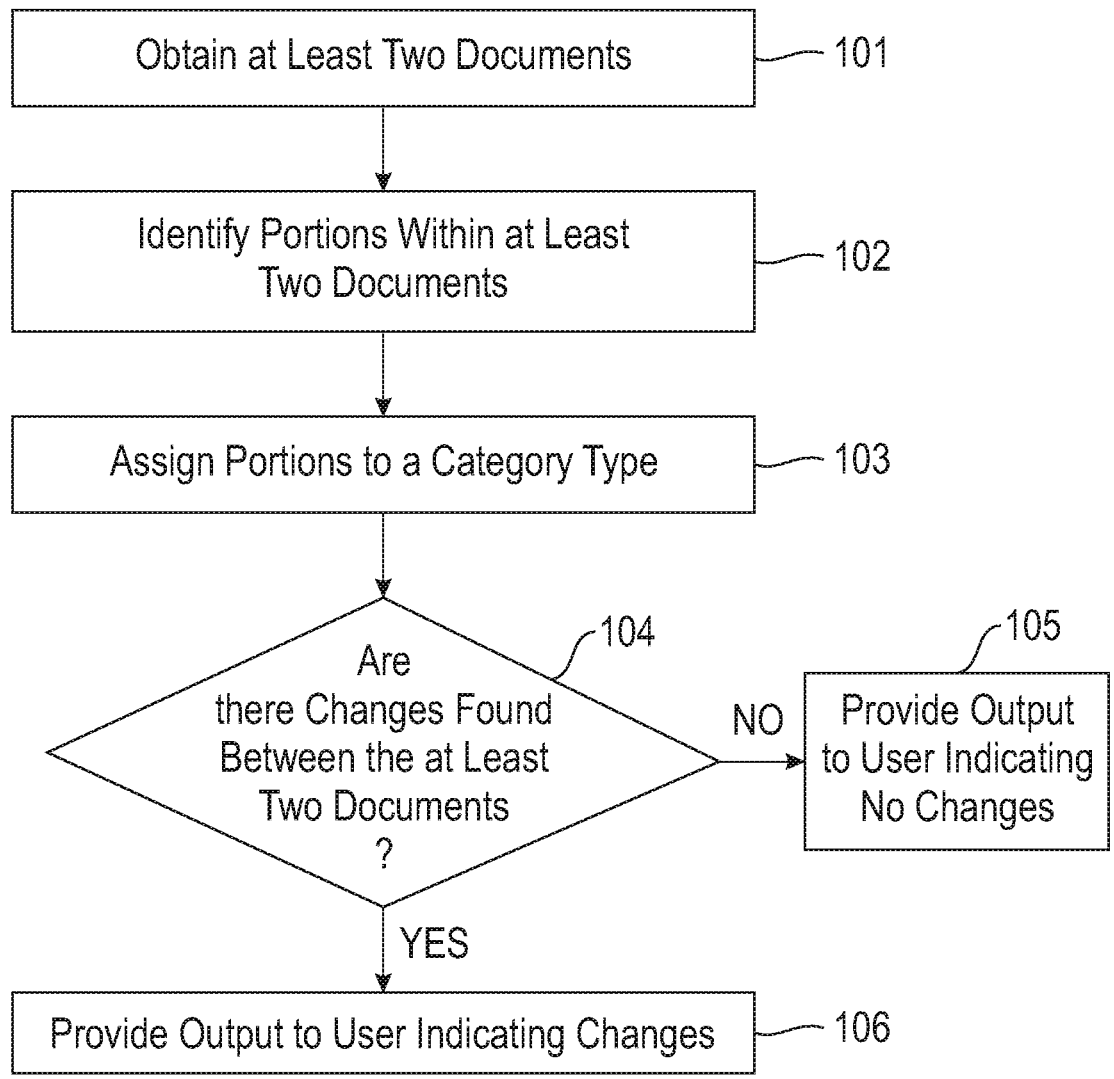
FIG. 1 illustrates a method of identifying changes between different versions of a document by identifying and aligning portions between the document versions.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Many documents that detail the rights and responsibilities of two or more entities may be very extensive, for example, the document may contain thousands of pages and many different sections. Additionally, these documents may be very technical since they may be directed to a particular domain, thereby making them difficult to read and digest for a person outside of that domain. Thus, many domains that have contracts have a person or department that is responsible for understanding different sections of the contracts. The person or department is generally very familiar with the document and document sections, thereby allowing another person who needs information regarding the document to contact that person or department with the request for information. However, when a new revision of the document is published or implemented, the person or department must learn what changed within the document.

Some documents may include a revision history chart, but generally this chart only identifies the major changes made to the document, thereby excluding the minor changes from the chart. Additionally, the revision chart usually provides a very small description of what changed, so it may be difficult to understand the effect of the change from the revision chart. Thus, the person or department generally has to read through each section to determine what change was made and the effect of the change on the entity, which is very difficult and time consuming. Thus, it may take a long time before the person or department can determine the effect of changes to the documents.

Some techniques have been introduced to determine the differences between different revisions or versions of the same document. For example, some word processing applications allow a user to compare two documents. The application then identifies what content has been added, deleted, or moved. However, this system merely compares the revisions of the document and identifies a change between the revisions and then provides an indication of that change. These identified changes may include changes that are not important, for example, formatting changes. Additionally, if sections have been moved within the document, the application does not accurately identify these moved sections if the sections are moved to a location beyond a predetermined distance from the original location of the section. Moreover, the application does not identify the substance of the change. For example, the application does not provide a description of the change that would allow a person or department to determine how the change affects the corresponding rule. In other words, the application may identify that a word or phrase has been added, deleted, or moved, but does not identify how that change affects the corresponding rule.

Some traditional techniques provide a method that partially summarizes the changes within the documents. For example, some techniques allow for creation of a revision history table with respect to source code files. As the source code is changed and a revision is committed, the system compares the source code file versions and determines what changes were made between the files. The system can then generate a revision history chart or header that identifies the changes between the two versions. However, this system works by identifying the changes and then listing the changes in the revision history chart. Such a system still does not provide a summary of how the change or revision affects the corresponding text or the entire document. Other systems in different applications work similarly. These systems are extractive summarizers and work with multiple restrictive assumptions. In other words, no traditional system generates a summary of the revision that would allow a user to read the summary and determine how the change affects the corresponding rule.

Additionally, a user, when looking for a change within a document, usually has a particular change type or category in mind. For example, the user may be looking for a change that affects a particular coverage, financial contribution, restriction, requirement, or the like. However, these changes can occur anywhere in the document and are not necessarily restricted to a single area of the document. Thus, a person may have to read the document in its entirety to find the complete set of changes regarding the target area or category. Even using the conventional change identification techniques, the user would be required to read through all the changes that are identified using the conventional techniques. Additionally, if a summarization technique is used, the desired change may be lost when the changes get summarized.

Accordingly, an embodiment provides a system and method for identifying changes between different versions of a document by identifying and aligning portions between the document versions. The system obtains at least two documents, where one of the documents is a different revision of another of the documents. In other words, the system obtains two documents that are different versions of the same document. Within each of the documents, the system identifies portions that correspond to groups of text containing a conceptual unit, for example, sentences, phrases, table groupings, list portions, and the like. To identify the portions, the system may first identify information units which include many portions, and, more specifically, portions that are both contextually related and positionally-connected or located together within the document. The information units include those portions that are located together within a document and that provide a contextual understanding of the purpose of the portions within the information unit.

The system then assigns the identified portions to a category type that identifies a topic of the portion. To assign a category, the system generates a semantic tag for the portion and then tags the portion with the semantic tag. Portions having similar semantic tags are then grouped into the same category type. The system can determine changes between or across the documents utilizing the portions. The system aligns portions across the documents that have a relationship and belong to the same category type. Once the portions are aligned, the system can classify changes based upon the portions. Unaligned portions are either missing portions or additional portions, depending on which version of the document the change is being identified with respect to. In other words, missing portions can be classified as deleted between versions of the document and additional portions can be classified as added between versions of the document, depending on the document version perspective. Aligned portions having semantic differences can be classified as changed or different portions.

Such a system provides a technical improvement over current systems for identifying document version differences. By identifying portions within the versions of a document, the system is able to align the portions. The system can then identify changes that occur in the portions across the document versions. This allows for a more complete identification of document changes as compared to conventional techniques that summarize changes. Additionally, since the described system and method is able to respond to a user query directed toward one or more categories of changes, the user does not have to manually identify all the changes in the document versions and determine if those changes are related to the target category. Thus, the described system and method provides a technique that is more efficient and accurate as compared to the conventional manual techniques. Additionally, using conventional techniques that identify every single change made between document versions, the user is not inundated with extraneous identified changes that do not affect the substance of the document, for example, format changes, font changes, paragraph numbering changes, and the like.

FIG. 1 illustrates a method for identifying changes between different versions of a document by identifying and aligning portions between the document versions. At 101, the system may obtain at least two documents, each document being a different revision or version of the same document. One version of the document will be referred to herein as the original document and a subsequent version of the document will be referred to herein as the revision or new version of the document. However, it should be understood that the original document does not necessarily mean the very first version of a document. Rather, the original document merely indicates that it is a version of the document that is earlier than the revision or new version of the document. Thus, the original document may actually be the third revision of the document, with the revision being a revision later than the third revision. Additionally, the user can provide the documents in any desired order. For example, the user can provide the original document as the second document and the revision document as the first document. For example, the user may want to use the latest version of the document as the starting point and the previous version as the document to be compared. This would result in additions, deletions, or changes being described with respect to the previous version. Conversely, providing the previous version as the starting point and the latest version of the document as the document to be compared will result in the additions, deletions, or changes being described with respect to the latest version.

The example that will be used throughout is the example of a contract. However, it should be understood by one skilled in the art that the systems and methods as described herein can be applied to any document that has revisions or versions. The contract may include different sections that provide information regarding the contract, for example, explanations of benefits, requirements for receiving benefits, procedures that must be followed, or the like. The contract may be a document created and enforced by a governmental agency or corporate entity, for example, a health insurance provision contract, an employment contract, a benefits contract, a services contract, a contract between a services provider and a consumer, or the like. Alternatively, the contract may be a document created and enforced by a group or other governing body, for example, a contract between a homeowner and a contractor, a neighborhood association contract, or the like. The entity creating and enforcing the contract will be referred to as the provider. An entity or sector that agrees to or signs-up for the contract will be referred to as the recipient.

To obtain the documents a user may upload the documents to the system or a data storage location accessible by the system. Alternatively, a user may provide a link or other marker to a location of the documents. For example, if a provider has provided a contract that is accessible on the Internet, the user may provide a URL (uniform resource location) link or other marker to the website or other Internet location. The system may also proactively obtain the documents. For example, if a link has been previously provided, the system may periodically access the link to determine if a new revision of the document has been provided at the link. Obtaining the documents may be performed using a variety of techniques.

Once the system obtains the documents, the system may parse the documents in order to identify different information included in the document. Parsing the documents can be performed using one or more document parsing techniques, for example, natural language processing, semantic analysis, parts-of-speech analyzer, and the like. Once the documents are parsed, the system can, at 102, identify portions within each of the obtained documents. Portions correspond to groups of text or information containing a conceptual unit, for example, sentences, phrases, table cells, list portions, signature blocks, or the like. In identifying portions, the system may first identify an information unit, also referred to as a processing unit or unit of information.

An information unit includes portions that are contextually related and positionally-connected. Positionally-connected means those portions which are located together or adjacently within the document, for example, in a table, paragraph, sentence or a few sentences, page, or the like. In other words, the system identifies those portions that are located together within a document and that provide a contextual understanding of the purpose of the portions within the information unit. For example, dividing portions from a list into different information units may result in a misunderstanding of each portion. Thus, all of the portions from the list may be kept together in a single processing unit. Identifying the information units and/or portions may be performed using a variety of heuristics, for example, natural language processing, semantic analysis, parts-of-speech analyzer, annotators, information extractors, and the like.

At 103, the system assigns at least a subset of the identified portions to a category type. Each category type corresponds to a topic of an portion. Using the contract example, category types may include eligibility criteria, admission limits, contributions, and the like. The system may not only assign portions to categories, but may also assign information units to categories. This assignment of portions and/or information units is referred to as category augmentation. Assigning an portion and/or information unit to a category includes generating a semantic tag for each portion and/or information unit being assigned. The semantic tag corresponds to the category label and identifies the topic or context of the portion and/or information unit. The portion and/or information unit is then tagged with the semantic label, thereby assigning the portion and/or information to the category associated with the semantic label.

Not all portions have to be assigned to a category. For example, the category of some portions may not be known to the system. As another example, the system may only assign portions that belong to pre-known and/or relevant categories, for example, those categories that correspond to frequently asked questions, frequently revised topics, categories defined by a user, default categories, or the like. Portions and/or information units may belong to more than one category and may be continuously augmented with new categories as new category labels are created or identified.

The portions and/or information units may also be enriched using custom attributes, also referred to as semantic attributes. The semantic attributes identify a portion of the portion that should be focused on when determining whether a change has occurred across the document versions. In other words, a custom attribute can be used to define (i) different portions of portions and/or information units as particular semantic terms and (ii) areas of focus for determining whether a change has occurred across document versions. For example, if an portion includes a monetary value, a user may define the monetary value as "amount." This then triggers the system to recognize that any change to the monetary value, no matter how small, should be identified as a difference. Additionally, the custom attributes assist in finding similar portions and/or information units when aligning the documents. The custom attributes can be defined in the form of a dictionary that identifies terms that are the same or should be treated the same, terms that are different, or other rules. This customization is particularly useful when the system is utilized across different domains.

At 104, the system determines whether changes have been found between the documents obtained at 101. To determine whether changes exist, the system aligns portions and/or information units across the document versions based upon a relationship between the portions and/or information unit across the document versions. In other words, the system identifies those portions and/or information units that, even though they may be changed, correspond to the same category or section of the document versions. Thus, the system can identify that the portions and/or information units are related, even if differences are found between them.

To align the portions and/or information units, the system utilizes rules that are learned using a classifier. The system sends the portions that have been annotated or categorized and/or augmented with semantic attributes to a rules learning module where rules are learned semi-automatically. These rules not only allow the system to identify portions and/or information units that should be identified as having a relationship across the document versions, but also allow the system to explain how the system determined whether the portions and/or information units were designated as similar or different. To generate the alignment rules, the system trains the learning module, which may be a machine-learning model, using supervised data that include portions and/or information units that have been annotated or labeled with a similarity status (e.g., similar, different, different but the concept is similar, etc.). Once the learning module is trained, the learning module outputs rules. A decision tree classifier is then trained using these rules. Once the decision tree classifier is trained, the tree is flattened out to extract the rules. As an optional step, before alignment, a user may review the rules and make modifications to the rules. The final rule set is then used for aligning the document versions.

Using the rules, the system can identify portions and/or information units across the document versions that have a relationship or that should be aligned. In other words, the system is attempting to identify matches between portions and/or processing units between document versions. This matching does not take into account whether information has changed between the document versions, but is instead attempting to identify which portions and/or information units in one document version correspond to or correlate with portions and/or information units in another document version. Once aligned, the system can then determine if changes exist between the document versions by comparing the substance of portions and/or information units across the document versions.

In identifying similarities or differences between portions and/or information units, the system may not only utilize the learned rules, but may also use one or more similarity techniques, for example, similarity measures, cosine similarity, clustering techniques, affinity measurements, class distribution measures, and the like. In identifying the similarity, the system may compute a similarity score between an portion and/or information unit in one document version with respect to another document version. In the event that a similarity score is computed, portions and/or information units having a similarity score above a predetermined threshold may be designated as similar portions and/or processing units. In other words, portions and/or information units having a similarity score above a predetermined threshold may be designated as having a relationship.

Identified changes can be classified into one of three categories, additions, deletions or removals, and differences. Additions and deletions are identified by identifying those portions and/or information units that do not have a corresponding portion and/or information unit in the other document version. In other words, additions and deletions or removals are those portions and/or information units that are left unaligned. Whether the unaligned portion and/or information unit is classified as an addition or deletion is based upon the perspective of the documents. In other words, depending on which version of the document the change is being identified with respect to, the unaligned portion is identified as either an addition or deletion. As an example, if document version 1 is used as the starting point, and document version 2 is the revision document and the changes are being described with respect to document version 2, an unaligned portion occurring in version 1 but not in version 2 would be considered a deletion and an unaligned portion occurring in version 2 but not in version 1 would be considered an addition. Portions and/or information units that are aligned and contain semantic differences across the document versions are identified as different portions and/or information units.

If there are no changes found between the document versions at 104, the system may provide an output to a user indicating that no changes were found at 105. An indication of no changes may occur when there are no changes with respect to a target category or category of interest, for example, a category identified within a user query. In other words, the document versions may have changes throughout, but the system may provide an indication of no changes if none of the changes related to the target category. Additionally, if the only changes that are identified are non-substantive changes (e.g., formatting, page number, changes a user has identified as non-substantive, etc.), the system may provide an indication of no changes.

On the other hand, if changes are identified at 104, the system may provide an output to a user indicating that changes were identified at 106. An indication of changes may occur when changes corresponding to a target category or category of interest have been identified. Thus, indications of changes or no changes may be dependent upon an identified category type and may not be indicative of whether the entire document contains or does not contain changes. In identifying changes or no changes, the system may also provide an explanation of the change, an explanation of why the system determined that a change should or should not be categorized as a significant change that changes the meaning or context of the portion and/or processing unit, an explanation of a rule that was used to determine whether a change existed, or the like.

Steps 101-106 may be performed independently, for example, upon identification of a new version of a document. These steps may also be performed in response to receiving a user query requesting that changes be identified. In other words, the system may not attempt to identify changes between documents until or unless a user query is received. The user query may identify what types of changes the user is interested in. For example, the user query may include a target category type or category type of interest. To identify the category type, the system may utilize parsing techniques to parse the user query, for example, natural language parsing techniques, semantic analysis, parts-of-speech analyzer, or the like. The parsing techniques are utilized to extract meaningful phrases which are then classified into categories. These categories are then compared to categories that portions and/or information units are assigned to.

Those portions and/or information units that are assigned to the target categories are then returned as a response to the query. In addition to using the query categories to find the portions and/or processing units, the known category labels used during category augmentation may be dynamically updated based upon the query categories. Additionally, assignment of a portion and/or information unit to a category may also be dynamically updated based upon received queries. Since the received queries are parsed to extract meaningful phrases in order to perform the search on the documents, the parsed query may be utilized to generate new semantic tags or category labels. The new semantic tags or category labels can then be utilized when assigning and/or reassigning portions and/or information units to categories. In other words, feedback from searched terms can be utilized to categorize portions and/or information units dynamically. Updating the category labels is performed in a completely unsupervised manner using a machine-learning model. While a supervised or semi-supervised technique could be utilized, the unsupervised technique is preferred due to the fact that less user intervention is required using the unsupervised technique.

Once the portions and/or processing units assigned to the query categories are returned, the system can then generate one or more natural language sentences that identify or describe the identified change and may also include an explanation corresponding to the change. Additionally, or alternatively, the system may simply provide a side-by-side view of the document versions with the portions and/or information units having the changes highlighted. Thus, the system may provide a highlighted side-by-side view in addition to an explanation of the change.

Figure 2:
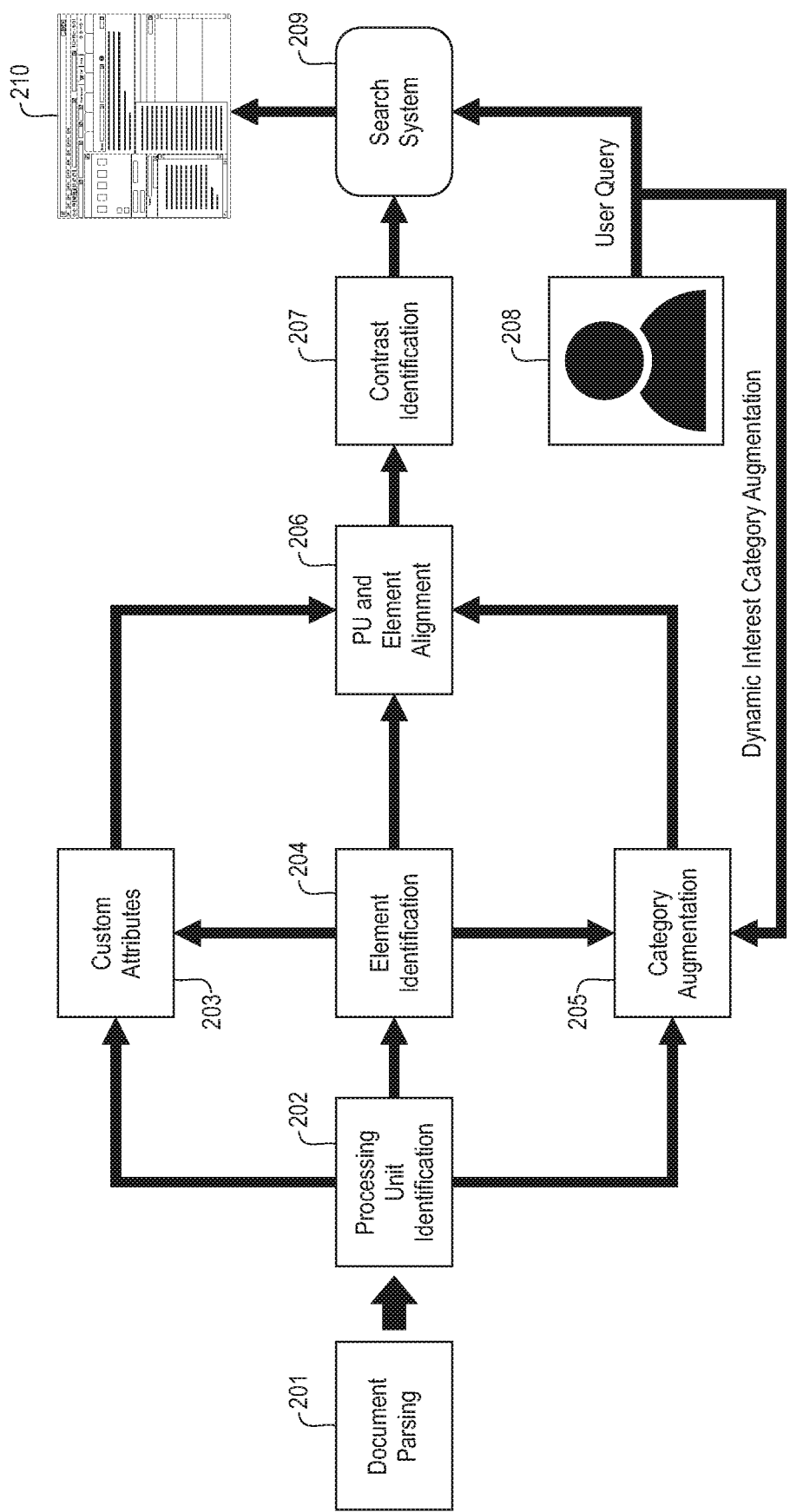
FIG. 2 illustrates an example system architecture for identifying changes between different versions of a document by identifying and aligning portions between the document versions.

FIG. 2 illustrates an overall system architecture of the described system. Documents are received and parsed using a document parsing component 201. From the parsing of the documents, the system identifies processing units, also referred to as information units, using the processing unit identification component 202. The processing units can then be further divided into elements, also referred to as portions, using the element identification component 204. The processing units and/or elements can be enriched with custom attributes using the custom attributes component 203. The custom attributes may be defined by a user to assist in identifying changes. The processing units and/or elements are also assigned to a category using the category augmentation component 205. The custom attributes may be used to assist in assigning the processing units and/or elements to a category. Using the custom attributes and assigned categories, the system aligns the processing units (PU) and/or elements using the PU and element alignment component 206. Once aligned, the system can identify changes between the versions of the document using the contrast identification component 207.

The system may receive a user query 208 requesting identification of a change between versions of the document. Using the user query 208 the system performs a search on the aligned documents using the search system component 209. Alignment of the documents may also occur responsive to receiving the search query. In this case, the system may utilize terms included in the search query to generate category types. These generated category types can then be used by the category augmentation component 205 when assigning processing units and/or elements to a category. Responsive to the query, the system may provide an output identifying the changes between the document versions 210. This output may include a visual output, as illustrated in FIG. 2. Additionally, or alternatively, the output may include a textual, auditory, or other modality of output. The identified changes are responsive to the query, thereby providing the user with the requested information.

Thus, the described systems and methods represent a technical improvement over current systems for document version change identification. Rather than requiring a user to manually review and compare different versions of a document to identify changes between the documents, the described system and method provide a technique for automatically identifying and providing an indication of the changes between different versions of a document. Additionally, the system can receive a query from the user to identify a particular change or changes with respect to a particular category, and the system is able to provide a response to that query identifying the changes with respect to the target information. Thus, the user does not have to manually find all sections within the document that may include information related to the category and identify any changes between the document versions. Additionally, unlike when using conventional change identification or summarization techniques, the user does not have to read all identified changes to determine if the change is related to the category of interest. Also, unlike conventional change summarization techniques, the user does not have to be concerned that a change affecting a target category is not included in the summarization.

Thus, the described system and method provide identification of changes within document versions that is more complete and accurate than conventional techniques. Additionally, the described system and method can respond to a user query directed toward a category of changes with any changes that are related to the category which is not possible using conventional techniques. Additionally, the user does not have to be concerned that changes are missed or not included in the identification of changes or in the response to the user query, which may occur with conventional techniques.

Figure 3:
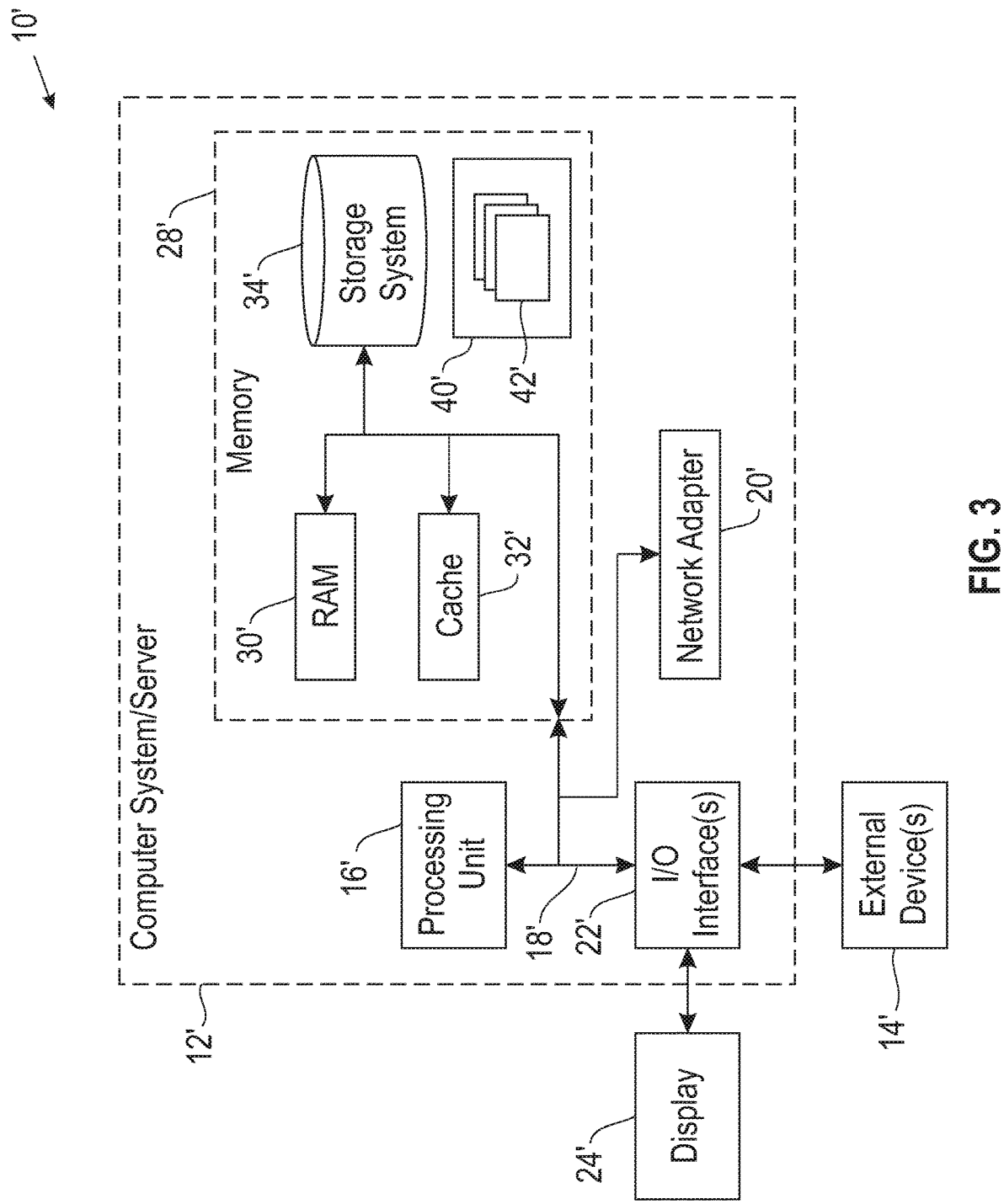
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   obtaining at least two documents, wherein one of the at least two documents comprises a revision different than another of the at least two documents;

identifying, within each of the at least two documents, processing units corresponding to contextually-related and positionally-connected groups of textual conceptual units, wherein the identifying comprises assigning each of the processing units to a category type and labelling each of the processing units with the category type;

assigning at least a subset of the identified processing units to a category type corresponding to a topic of a given portion, wherein the assigning comprises (i) generating a semantic tag for each of the identified processing units in the subset and (ii) tagging each of the identified processing units in the subset with the semantic tag, wherein the semantic tag corresponds to a label of the category type for and identifies a topic of a given of the identified processing units;

enriching the at least a subset of the identified processing units with custom attributes, wherein the custom attributes define areas of focus of change that correspond to processing units having changes that are to be identified as differences, wherein the custom attributes are defined in a dictionary form; and determining changes between the at least two documents, wherein the determining comprises (iii) aligning, utilizing rules learned using a classifier, given processing units across the at least two documents based upon a relationship between the given processing units across the at least two documents, (iv) for given processing units across the at least two documents having a custom attribute, identifying a change as a change and for given processing units across the at least two documents not having an associated custom attribute, identifying semantic differences between the aligned processing units, and (v) identifying any remaining unaligned processing units, wherein the aligning comprises identifying given processing units across the at least two documents having a same semantic tag, wherein changes between the at least two documents corresponding to changes not related to a target category are indicated as no change.

2. The method of claim 1, comprising receiving, from a user, a query requesting identification of a change between the at least two documents related to a particular category type of interest.

3. The method of claim 2, wherein the identifying is performed responsive to receiving the user query.

4. The method of claim 2, wherein the generating a semantic tag is based upon terms included in the received query.

5. The method of claim 2, comprising providing, responsive to the determining a change, a natural language identification of a change corresponding to the user query.

6. The method of claim 1, comprising learning alignment rules by generating a decision tree classifier that is trained utilizing supervised data comprising a training set of (i) portions and (ii) a change status of the processing units; and
    wherein the defined rules are used in aligning the processing units across the at least two documents.

7. The method of claim 1, comprising providing an explanation of the determined changes, the explanation identifying a rule used to determine a change.

8. The method of claim 1, wherein the unaligned processing units are identified as at least one of: added processing units and removed processing units; and wherein
    the aligned processing units having semantic differences are identified as differences.

9. An apparatus, comprising:
at least one processor; and
a computer readable storage medium having computer readable program code embodied therewith and executable by the at least one processor, the computer readable program code comprising:
computer readable program code configured to obtain at least two documents, wherein one of the at least two documents comprises a revision different than another of the at least two documents;
computer readable program code configured to identify, within each of the at least two documents, processing units corresponding to contextually-related and positionally-connected groups of textual conceptual units, wherein the identifying comprises assigning each of the processing units to a category type and labelling each of the processing units with the category type;
computer readable program code configured to assign at least a subset of the identified processing units to a category type corresponding to a topic of a given portion, wherein the assigning comprises (i) generating a semantic tag for each of the identified processing units in the subset and (ii) tagging each of the identified processing units in the subset with the semantic tag, wherein the semantic tag corresponds to a label of the category type for and identifies a topic of a given of the identified processing units;
computer readable program code configured to enrich the at least a subset of the identified processing units with custom attributes, wherein the custom attributes define areas of focus of change that correspond to processing units having changes that are to be identified as differences, wherein the custom attributes are defined in a dictionary form; and
computer readable program code configured to determine changes between the at least two documents, wherein the determining comprises (iii) aligning, utilizing rules learned using a classifier, given processing units across the at least two documents based upon a relationship between the given processing units across the at least two documents, (iv) for given processing units across the at least two documents having a custom attribute, identifying a change as a change and for given processing units across the at least two documents not having an associated custom attribute, identifying semantic differences between the aligned processing units, and (v) identifying any remaining unaligned processing units, wherein the aligning comprises identifying given processing units across the at least two documents having a same semantic tag, wherein changes between the at least two documents corresponding to changes not related to a target category are indicated as no change.

10. A computer program product, comprising:
a computer readable storage medium having computer readable program code embodied therewith, the computer readable program code executable by a processor and comprising:
computer readable program code configured to obtain at least two documents, wherein one of the at least two documents comprises a revision different than another of the at least two documents;
computer readable program code configured to identify, within each of the at least two documents, processing units corresponding to contextually-related and positionally-connected groups of textual conceptual units, wherein the identifying comprises assigning each of the processing units to a category type and labelling each of the processing units with the category type;

computer readable program code configured to assign at least a subset of the identified processing units to a category type corresponding to a topic of a given portion, wherein the assigning comprises (i) generating a semantic tag for each of the identified processing units in the subset and (ii) tagging each of the identified processing units in the subset with the semantic tag, wherein the semantic tag corresponds to a label of the category type for and identifies a topic of a given of the identified processing units;

computer readable program code configured to enrich the at least a subset of the identified processing units with custom attributes, wherein the custom attributes define areas of focus of change that correspond to processing units having changes that are to be identified as differences, wherein the custom attributes are defined in a dictionary form; and computer readable program code configured to determine changes between the at least two documents, wherein the determining comprises (iii) aligning, utilizing rules learned using a classifier, given processing units across the at least two documents based upon a relationship between the given processing units across the at least two documents, (iv) for given processing units across the at least two documents having a custom attribute, identifying a change as a change and for given processing units across the at least two documents not having an associated custom attribute, identifying semantic differences between the aligned processing units, and (v) identifying any remaining unaligned processing units, wherein the aligning comprises identifying given processing units across the at least two documents having a same semantic tag, wherein changes between the at least two documents corresponding to changes not related to a target category are indicated as no change.

11. The computer program product of claim 10, comprising receiving, from a user, a query requesting identification of a change between the at least two documents related to a particular category type of interest.

12. The computer program product of claim 11, comprising providing, responsive to the determining a change, a natural language identification of a change corresponding to the user query.

13. The computer program product of claim 10, comprising learning alignment rules by generating a decision tree classifier that is trained utilizing supervised data comprising a training set of (i) processing units and (ii) a change status of the processing units; and wherein the defined rules are used in aligning the processing units across the at least two documents.

14. The computer program product of claim 10, comprising providing an explanation of the determined changes, the explanation identifying a rule used to determine a change.

15. The computer program product of claim 10, wherein the unaligned processing units are identified as at least one of: added processing units and removed processing units; and wherein the aligned processing units having semantic differences are identified as differences.

* * * * *